(12) United States Patent
Kumarji et al.

(10) Patent No.: US 12,273,347 B2
(45) Date of Patent: Apr. 8, 2025

(54) TECHNIQUES AND ARCHITECTURES FOR SHARING REMOTE RESOURCES AMONG A TRUSTED GROUP OF USERS

(71) Applicant: Salesforce, Inc., San Francisco, CA (US)

(72) Inventors: Jayanth Parayil Kumarji, San Francisco, CA (US); Priyadarshini Mitra, San Francisco, CA (US); Kevin Terusaki, Oakland, CA (US); Zhidong Ke, Milpitas, CA (US); Yifeng Liu, Palo Alto, CA (US); Utsavi Benani, Fremont, CA (US); Heng Zhang, San Jose, CA (US); Evan Jiang, San Francisco, CA (US); Birva Joshi, San Francisco, CA (US); Yogesh Patel, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 89 days.

(21) Appl. No.: 17/238,180

(22) Filed: Apr. 22, 2021

(65) Prior Publication Data
US 2022/0345458 A1    Oct. 27, 2022

(51) Int. Cl.
*H04L 29/06* (2006.01)
*H04L 9/40* (2022.01)

(52) U.S. Cl.
CPC ........ *H04L 63/102* (2013.01); *H04L 63/0807* (2013.01); *H04L 63/104* (2013.01); *H04L 63/105* (2013.01)

(58) Field of Classification Search
CPC ............... H04L 63/102; H04L 63/0807; H04L 63/104; H04L 63/105
(Continued)

(56) References Cited

U.S. PATENT DOCUMENTS 5,577,188 A    11/1996  Zhu
5,608,872 A     3/1997  Schwartz et al.
(Continued)

OTHER PUBLICATIONS

Building a Zero Trust Architecture Using Kubernetes, D'Silva et al, Apr. 2021 (Year: 2021).*

*Primary Examiner* — Jahangir Kabir
(74) *Attorney, Agent, or Firm* — Kwan & Olynick LLP

(57) ABSTRACT

Various techniques and mechanisms for sharing remote resources among a trusted group are disclosed. A credential management agent utilizes a resource credential for a first user to access a secure resource corresponding to the first user for a second user by at least validating a second user and validating a consent of the first user to allow the second user to access the secure resource using the resource credential for the first user. The secure resource resides on a remote server system accessible via one or more application program interfaces (APIs). A platform management agent provides an interface for shared resource-agnostic credential sharing. The platform management agent validates credentials for the second user as belonging to a trusted group and forwards a request for access to the secure resource for the second user to the credential management agent. In response to receiving the resource credential for the first user to access the secure resource, the platform management agent accesses the secure resource on behalf of the second user to allow the second user to utilize the secure resource.

8 Claims, 5 Drawing Sheets

(58) Field of Classification Search
USPC .................................................. 726/5
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 11,632,360 B1 * | 4/2023 | Tan .................. G06F 3/0622 726/4 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0153655 A1 * | 8/2004 | Rolfe .................. G06F 21/32 713/185 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2014/0068746 A1 * | 3/2014 | Gonzalez .......... H04W 12/06 726/9 |
| 2022/0038462 A1 * | 2/2022 | Chauhan .......... H04L 63/101 |

* cited by examiner

TECHNIQUES AND ARCHITECTURES FOR SHARING REMOTE RESOURCES AMONG A TRUSTED GROUP OF USERS

TECHNICAL FIELD

One or more implementations relate to the field of secure resource security and access management; and more specifically, to the creation and use of a mechanism that can provide transparent sharing and access of secure remote resources among users within a trusted group.

BACKGROUND ART

One prior art technique of resource sharing is to provide links to remote resources with associated usernames and passwords if the resources are secure. By using electronic mail, instant messaging or other communication techniques access to these resources are shared between one or more users. As a result, this approach can be cumbersome for users and can result in unnecessary security issues. For example, if a user emails a link to a secure resource to an unauthorized party by accident, the resource can be compromised.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
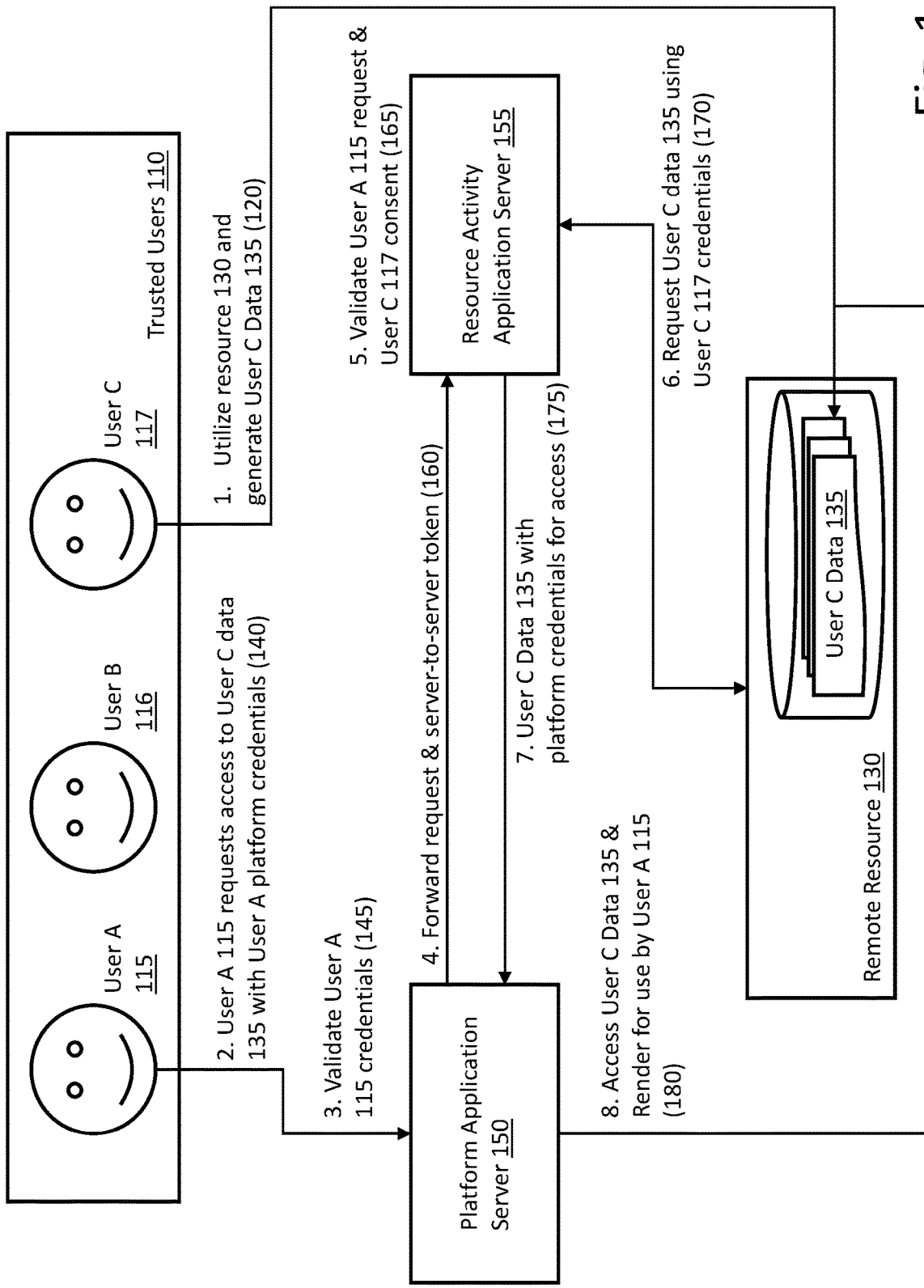
FIG. 1 is a block diagram of one embodiment of a configuration to allow any member of a trusted group of users to access a secure remote resource using credentials of one member of the trusted group.

The following description describes implementations for sharing access to secure remote resource among a group of trusted users. In collaborative work environments different types of resources can be shared among groups of users. For example, video conferencing is a commonly-used tool in many different work environments. Meetings held by video conferencing are commonly recorded for various reasons including, for example, training purposes.

In the examples that follow, access to remote resources (e.g., data representing a recorded meeting an associated metadata) can be managed on a platform utilizing a single user's credentials for the remote resource(s). Access can be shared among a trusted group having access to the platform and can be managed with one or more application program interfaces (APIs). In some embodiments, the shared platform can give the experience (or feel) of the platform hosting and/or providing the remote resource by providing utilizing a resource owner's credentials to provide access via the platform to other users. These other users can be members of a dynamically modifiable trusted group, where all members of the trusted group are given access to remote resources in this manner.

In one embodiment, trust within the trusted group can be based on platform credentials (in contrast to remote resource credentials). Thus, the individual users within the group can have their corresponding user accounts managed by the platform provider without the need to share these credentials or to acquire additional credentials. In one example embodiment, to create a pool of shared resources, each trusted user in a trusted group can opt-in and share their remote resources. The opt-in process can include, for example, a user providing the platform with remote resource credentials that can be used for subsequent accesses to the resource by any member of the trusted group.

This allows, for example, the ability to set up a trusted group of users (e.g., members of a product team) that can share their individual remote resources that they have opted-in and have those accesses backed by the platform and credentials for the platform. The platform can be, for example, a cloud-based on-demand services environment. Other types of platforms can also be supported.

In one embodiment, when a user belonging to the trusted group wishes to access a remote shared resource (e.g., a recorded meeting) that the requesting user does not own, the requesting user can make the request through the platform (e.g., salesforce). The platform can validate the requesting user using platform credentials to determine whether the requesting user is authorized to access the remote resource. In one embodiment, this means that the user is a member of a trusted group that is authorized to access the host platform and the remote resource. Other configurations can also be supported.

If the user is validated, the platform can determine if the owner of the requested remote resource has opted-in to the sharing pool (trusted group). If so, the platform can fetch the owner's credentials for the remote resource and make an API call to the remote resource on behalf of the requesting user utilizing the owner's remote resource credentials. The platform can then, for example, provide a Universal Resource Indicator (URI) to the requesting user with any necessary credentials to access the remote resource. This access can be provided, for example, via a user interface (UI) available to members of the trusted group.

FIG. 1 is a block diagram of one embodiment of a configuration to allow any member of a trusted group of users to access a secure remote resource using credentials of one member of the trusted group. Trusted group 110 can include any number of users (e.g., 115, 116, 117) that have authorized access to platform application server 150 and to resource activity application server 155. In one embodiment, each user can have individual accounts associated with platform application server 150 and one or more of the users can have accounts with resource activity application server 155 that are individually authorized and authenticated. Platform application server 150 and resource activity application server 155 can be, for example, one or more application servers in a salesforce environment to provide different services to authorized users.

In various embodiments, any number of groups of trusted users can be supported and individual users can belong to multiple trusted groups. In the example of FIG. 1, remote resource 130 is a remote resource accessible by one or more of users forming trusted group 110. Remote resource 130 can be remote from platform application server 150 and resource activity application server 155 in the sense that remote resource 130 can be provided by a different provider with a different set of host resources. In the example of FIG. 1, remote resource 130 provides recording functionality, which can be, for example, hosting of video conferences that can be recorded, audio recording (e.g., multi-track mixing), broadcast digital video recorder (DVR), Big Data files, database, etc. The following examples will be based on use of a video conference service; however, many other types of remote resources can be supported.

In one example embodiment, a user (e.g., User C 117) from trusted group 110 can conduct a meeting (120) utilizing remote resource 130 in which one or more data files (e.g., recordings) 135 are created or modified. The meeting is conducted utilizing credentials that belong to the user for remote resource 130 (i.e., not the user's credentials for platform application server 150 and/or resource activity application server 155). At some later point in time, a second user (e.g., 115) from trusted group may request (140) one or more recordings 135 from remote resource 130. This request is processed by platform application server 150 using the second user's credentials for platform application server 150 (i.e., not credentials for remote resource 130).

In response to the request, platform application server 150 can validate (145) the second user's platform credentials and membership in trusted group 110. In one embodiment, platform application server 150 can forward (160) the request (or generate a new server-to-server request) to resource activity application server 155. In one embodiment, the forwarded request utilizes a server-to-server token for validation; however, other mechanisms for validation can be supported.

In one embodiment, in response to receiving the forwarded request, resource activity application server 155 can validate the request and whether the original user (e.g., 117) has consented to sharing access to remote resource 130 with trusted group 110 through resource activity application server 155 and platform application server 150. Resource activity application server 155 can provide (175) the original user's credentials for remote resource 130 (and possibly additional metadata) to platform application server 150. In one embodiment, resource activity application server 155 can provide platform application server 150 with a URI and credentials for the requested recording 135 (or other type of resource). Alternatively, or additionally, User C data 135 can be accessed by platform application server 150 and rendered for use by User A 115 (180) to provide the user experience of platform application server 150 hosting User C data 135.

Platform application server 150 can access the original user's recordings 135 (or other remote resources) on remote resource 130 using the original user's credentials. Platform application server 150 can then provide access to one or more of recordings 135 on remote resource 130 for the second user (or any other user in trusted group 110). Access to multiple remote resources can be managed in this manner.

In the example embodiment of FIG. 1 utilizing a video conference service, platform application server 150 is responsible for managing some or all of the meeting and recording metadata and resource activity application server 155 is responsible for managing user platform credentials. Thus, if a given user wants to access a meeting recording that they do not own, they can request it through platform application server 150 as described above.

This results in a set of trusted users and a pool of trusted resources that are back by each user's platform credentials and can allow meeting recordings for all users in a group to be available to all users in the group with out hosting the recordings. Other types of remote resources are handled in a similar manner. In some embodiments, a user can withdraw permission for other users to access remote resources belonging to that user.

Figure 2:
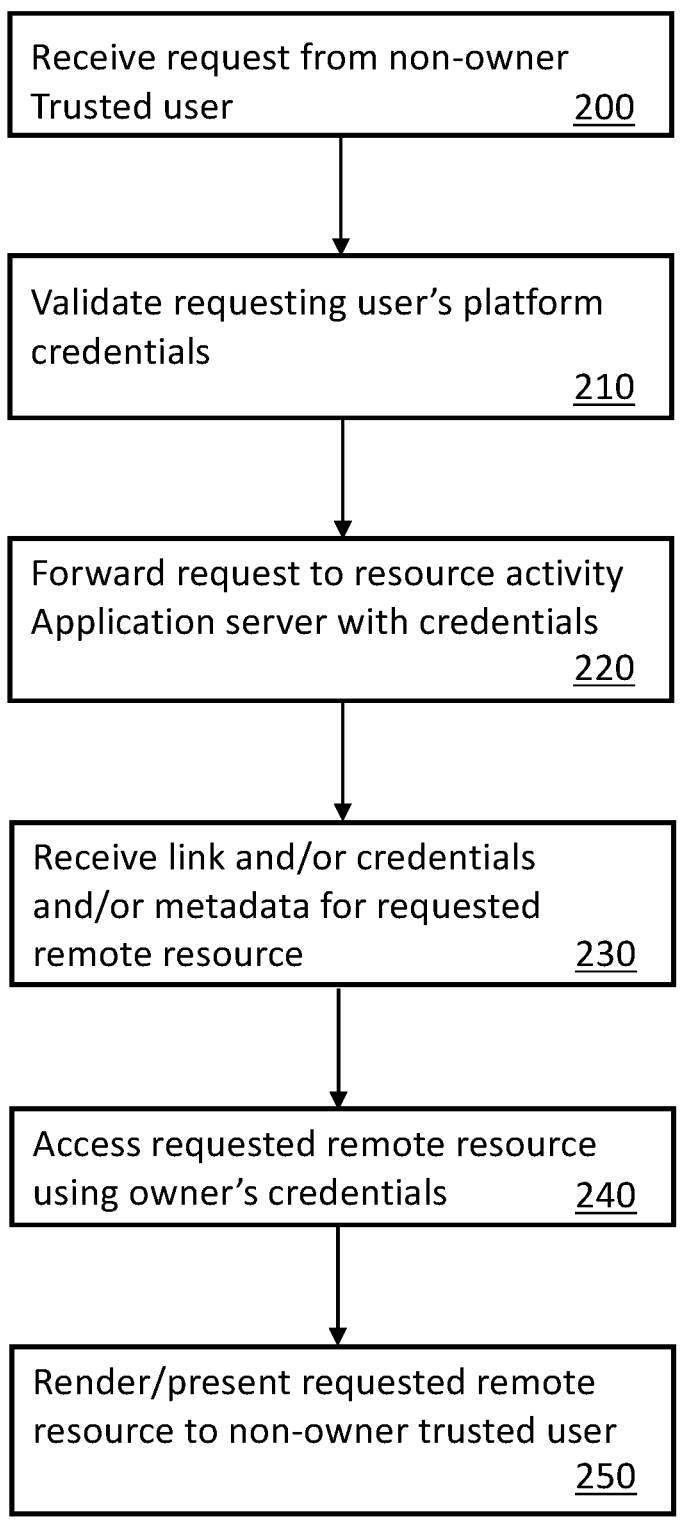
FIG. 2 is a flow diagram of one embodiment of a technique to allow a trusted group of users to access a secure remote resource using credentials of one member of the trusted group via a platform application server.

FIG. 2 is a flow diagram of one embodiment of a technique to allow a trusted group of users to access a secure remote resource using credentials of one member of the trusted group via a platform application server. The technique of FIG. 2 is described in terms of a platform application server; however, multiple application servers can collaboratively provide the functionality described with respect to FIG. 2.

In one embodiment, the platform application server (e.g., 150 in FIG. 1) can receive a request to access a secure remote resource from a non-owner trusted user (e.g., user in group 110 in FIG. 1), 200. As one example, the platform application server can provide various on-demand services to one or more users. The platform application server can be part of a salesforce environment, or part of an online training environment, etc. The platform application server can have an associated interface through which one or more users can access the services provided by the platform application server. The interface can be utilized with, for example, a browser.

In one embodiment, the platform application server can validate the requesting (non-owner) user's platform credentials, 210. The platform application server can validate the user's platform credentials in any appropriate manner. During or after the validation of the user's platform credentials, the platform application server can determine whether the user is a member of any trusted groups. Using the techniques and architectures described herein, the user can access remote resources owned by other members of the trusted group using platform credentials through the platform interface. This increases the functionality of the platform interface and improves the user's platform experience.

The platform application server can forward the request to the resource activity application server (e.g., 155 in FIG. 1) along with any necessary credentials, 220. In one embodiment, the requesting user's platform credentials are forwarded with the request. In alternate embodiments, some intermediate or temporary credential mechanism can be utilized. The functionality of the resource activity application server in response to the forwarded request is described in greater detail below with respect to FIG. 3.

The platform application server can receive from the resource activity application server a link and/or credentials and/or metadata for use to access the requested remote resource, 230. In one embodiment, the platform application server receives a link to the requested resource along with the owner's credentials to allow the platform application server to access the requested remote resource an provide to the requesting user via the platform interface as if the requested resource were hosted by the platform. The platform application server can also receive metadata associated with the requested remote resource.

The platform application server can then access the requested remote resource using the owner's credentials, 240. In one embodiment, the platform application server can use the received link to request access to the remote resource and present the owner's credentials received from the resource activity platform to gain access to the requested resource.

The platform application server can then present the requested resource to the requesting user, 250. In one embodiment, this presentation can be via the platform interface. In other embodiments, the requested resource can be combined with other content to render a modified/augmented version of the originally requested resource.

Figure 3:
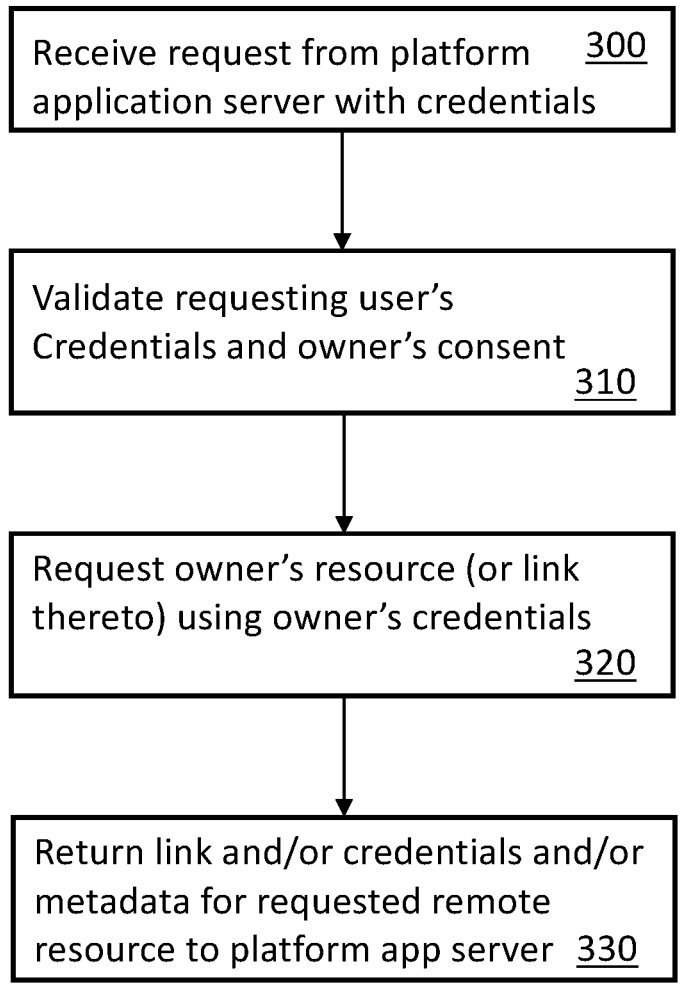
FIG. 3 is a flow diagram of one embodiment of a technique to allow a trusted group of users to access a secure remote resource using credentials of one member of the trusted group via a resource activity application server.

FIG. 3 is a flow diagram of one embodiment of a technique to allow a trusted group of users to access a secure remote resource using credentials of one member of the trusted group via a resource activity application server. The technique of FIG. 3 is described in terms of a resource activity application server; however, multiple application servers can collaboratively provide the functionality described with respect to FIG. 3.

The resource activity application server (e.g., 155 in FIG. 1) can receive a request from the platform application server with credentials, 300. The credentials can be, for example, the requesting user's platform credentials or some intermediate credentials (e.g., a server-to-server token). The request can be for some remote resource that is owned by a member of a trusted group to which the requesting user belongs.

The resource activity application server can validate the requesting user's credentials (or the credentials received from the platform application server) and the resource owner's consent to share the remote resource, 310. In some embodiments, a user wishing to grant permission for one or more trusted users to access remote resources owned by that user may do so through an interface provided by the resource activity application server. The resource activity application server can have an associated interface through which one or more users can access the services provided by the resource activity application server. The interface can be utilized with, for example, a browser. In alternate embodiments, the owner can grant permission via the platform application server.

In response to validating the credentials and verifying the owner's consent, the resource activity application server can request the remote resource (or a link thereto) from the remote platform/environment hosting the requested resource, 320, using the owner's credentials for that platform/environment. In one embodiment, a user can opt-in to share one or more owned resources with one or more trusted groups so that all members of the trusted group have access to the shared resource. Thus, as the individual members of the group change the active members of the group have access to the shared resources. In other embodiments, resources can be shared in a more one-to-one manner in which the owner can grant and revoke access to a shared resource for individual users.

The resource activity application server can return to from the platform application server a link and/or credentials and/or metadata for use to access the requested remote resource, 330. In one embodiment, the resource activity application server sends a link to the requested resource along with the owner's credentials to allow the platform application server to access the requested remote resource and provide to the requesting user via the platform interface as if the requested resource were hosted by the platform. The resource activity application server can also send metadata associated with the requested remote resource.

Thus, the platform application server and/or the resource activity application server can provide an interface for shared resource-agnostic credential sharing to allow access of a secure remote resource on behalf of an owner (e.g., a user in the trusted group) to so that a non-owner (e.g., another user in the trusted group) can utilize the secure remote resource.

In one embodiment, a system to provide the functionality described herein can include a credential management agent and a platform management agent. The credential management agent can utilize a resource credential for a first user to access a secure resource corresponding to the first user for a second user by at least validating a second user and validating a consent of the first user to allow the second user to access the secure resource using the resource credential for the first user. The secure resource resides on a remote server system accessible via one or more application program interfaces (APIs). The platform management agent provides an interface for shared resource-agnostic credential sharing. The platform management agent also validates credentials for the second user as belonging to a trusted group and forwards a request for access to the secure resource for the second user to the credential management agent. In response to receiving the resource credential for the first user to access the secure resource, the platform management agent accesses the secure resource on behalf of the second user to allow the second user to utilize the secure resource.

In one embodiment, the first user and the second user are both members of a trusted group, any member of which can access the secure resource utilizing the first user's credentials. In one embodiment, users can be dynamically added to and removed from the trusted group. In one embodiment, the forwarded request for access to the secure resource comprises at least a server-to-server token as a credential associated with the request. In one embodiment, the platform management agent interface provides the second user access to platform services and to the secure resource. In one embodiment, the first user, as a member of the trusted group, opts in to share the resource with members of the trusted group.

In one embodiment, a non-transitory computer-readable medium is provided to store instructions. The instruction, when executed by one or more processors are configurable to cause the one or more processors to receive a request from a first user to access a remote secure resource that is hosted in a computing environment that is distinct from a local computing environment in which the request is made. In one embodiment, the instructions are further configurable to validate credentials for the first user to access the local computing environment and forward the request to a resource activity application server upon successful validation of the credentials for the first user. In one embodiment, the instructions are further configurable to receive information to allow access to the remote secure resource by the first user utilizing credentials of a second user and to provide access to the remote secure resource utilizing the credentials for the second user through a user interface of the local computing environment.

In one embodiment, the instructions are further configurable such that the first user and the second user are both members of a trusted group within the local computing environment, any member of which can access the secure resource utilizing the first user's credentials. In one embodiment, the instructions are further configurable such that users can be dynamically added to and removed from the trusted group.

In one embodiment, a request is received from a first user to access a remote secure resource that is hosted in a computing environment that is distinct from a local computing environment in which the request is made. Credentials are validated for the first user to access the local computing environment. The request is forwarded to a resource activity application server upon successful validation of the credentials for the first user. Information is received to allow access to the remote secure resource by the first user utilizing credentials of a second user. Access is provided to the remote secure resource utilizing the credentials for the second user through a user interface of the local computing environment.

In one embodiment, the first user and the second user are both members of a trusted group, any member of which can access the secure resource utilizing the first user's credentials. In one embodiment, users can be dynamically added to and removed from the trusted group. In one embodiment, the forwarded request for access to the secure resource comprises at least a server-to-server token as a credential associated with the request. In one embodiment, the platform management agent interface provides the second user access to platform services and to the secure resource. In one embodiment, the first user, as a member of the trusted group, opts in to share the resource with members of the trusted group.

In one embodiment, a non-transitory computer-readable medium is provided to store instructions. The instruction, when executed by one or more processors are configurable to cause the one or more processors to receive, from a platform application server, a request on behalf of a first user to access a remote secure resource that is hosted in a computing environment that is distinct from a local computing environment in which the request is made, where the remote secure resource is owned by a second user and validate, with a resource activity application server, credentials for the first user and consent from a second user for the first user to access the remote secure resource. In one embodiment, the instructions are further configurable to request access to the remote secure resource utilizing credentials for the second user, if the credentials for the first user and the consent are validated and to send, to the platform application server, information to allow access to the remote secure resource by the first user utilizing credentials of a second user.

In one embodiment, the instructions are further configurable such that the first user and the second user are both members of a trusted group within the local computing environment, any member of which can access the secure resource utilizing the first user's credentials. In one embodiment, the instructions are further configurable such that users can be dynamically added to and removed from the trusted group.

In one embodiment, the first user and the second user are both members of a trusted group, any member of which can access the secure resource utilizing the first user's credentials. In one embodiment, users can be dynamically added to and removed from the trusted group. In one embodiment, the forwarded request for access to the secure resource comprises at least a server-to-server token as a credential associated with the request. In one embodiment, the platform management agent interface provides the second user access to platform services and to the secure resource. In one embodiment, the first user, as a member of the trusted group, opts in to share the resource with members of the trusted group.

In one embodiment, a platform application server receives a request on behalf of a first user to access a remote secure resource that is hosted in a computing environment that is distinct from a local computing environment in which the request is made. The remote secure resource is owned by a second user. A resource activity application server validates credentials for the first user and consent from a second user for the first user to access the remote secure resource. Access to the remote secure resource is requested utilizing credentials for the second user if the credentials for the first user and the consent are validated. The platform application server sends information to allow access to the remote secure resource by the first user utilizing credentials of a second user.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)).

Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.).

As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code, while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

In one embodiment, a system can include a credential management agent to utilize a resource credential for a first user to access a secure resource corresponding to the first user for a second user by at least validating a second user and validating a consent of the first user to allow the second user to access the secure resource using the resource credential for the first user. In some embodiments, the first user and the second user are both members of a trusted group, any member of which can access the secure resource utilizing the first user's credentials. In some embodiments, users can be dynamically added to and removed from the trusted group.

Figure 4:
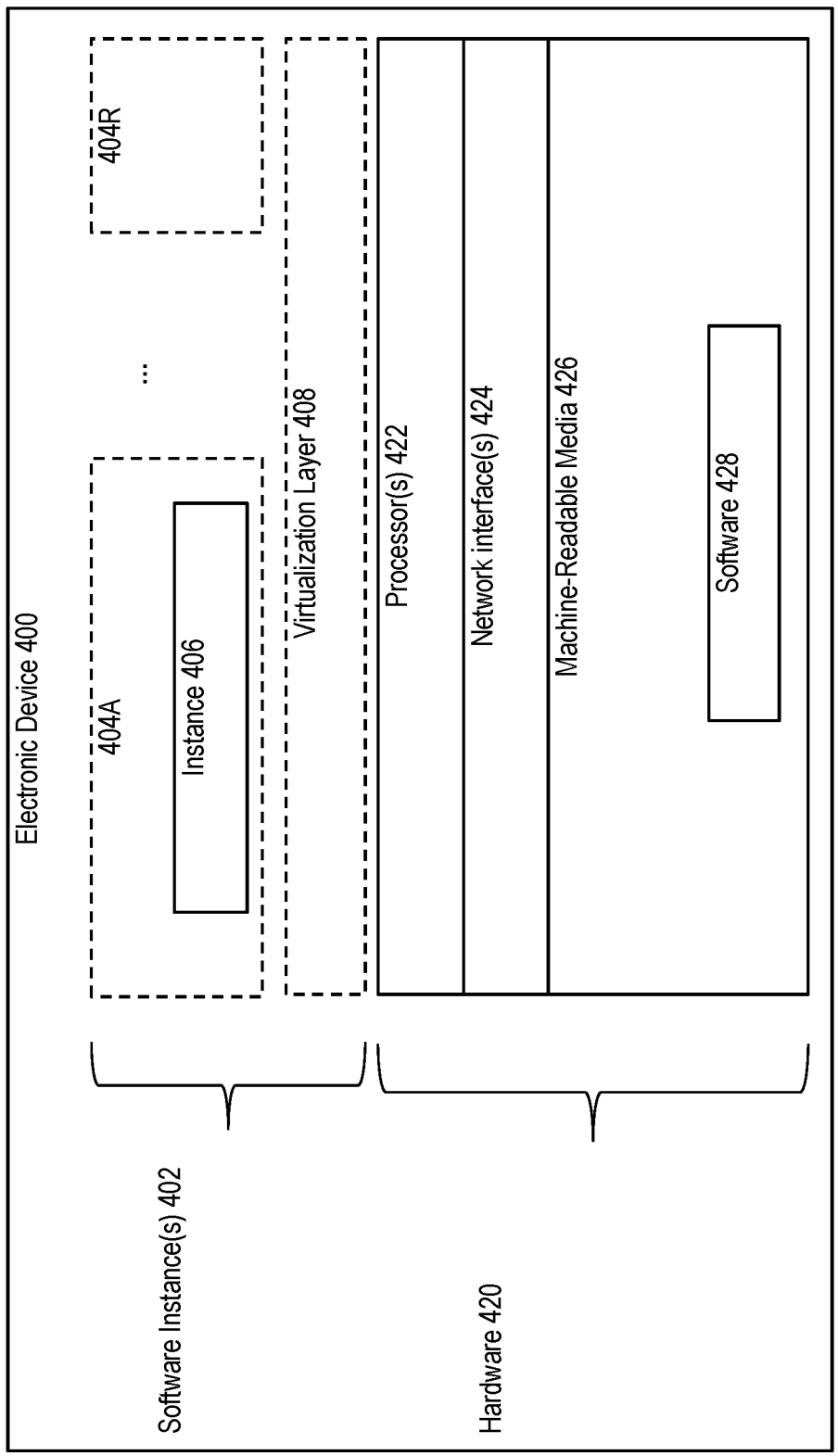
FIG. 4 is a block diagram illustrating an electronic device according to some example implementations.

FIG. 4 is a block diagram illustrating an electronic device 400 according to some example implementations. FIG. 4 includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the remote resource sharing services described above may be implemented in one or more electronic devices 400. In some embodiments, software 428 can provide some or all of the functionality described with respect to FIG. 2. In other embodiments, software 428 can provide some or all of the functionality described with respect to FIG. 3.

In one implementation: 1) each of the clients is implemented in a separate one of the electronic devices 400 (e.g., in end user devices where the software 428 represents the software to implement clients to interface directly and/or indirectly with the remote resource sharing service (e.g., software 428 represents a web browser, a native client, a portal, a command-line interface, and/or an application programming interface (API) based upon protocols such as Simple Object Access Protocol (SOAP), Representational State Transfer (REST), etc.)); 2) the remote resource sharing service is implemented in a separate set of one or more of the electronic devices 400 (e.g., a set of one or more server devices where the software 428 represents the software to implement the remote resource sharing service); and 3) in operation, the electronic devices implementing the clients and the remote resource sharing service would be communicatively coupled (e.g., by a network) and would establish between them (or through one or more other layers and/or or other services) connections for submitting requests for access to remote resources to the remote resource sharing service and returning a link or other connection to the remote resource to the clients. Other configurations of electronic devices may be used in other implementations (e.g., an implementation in which the client and the remote resource sharing service are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 508 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 5:
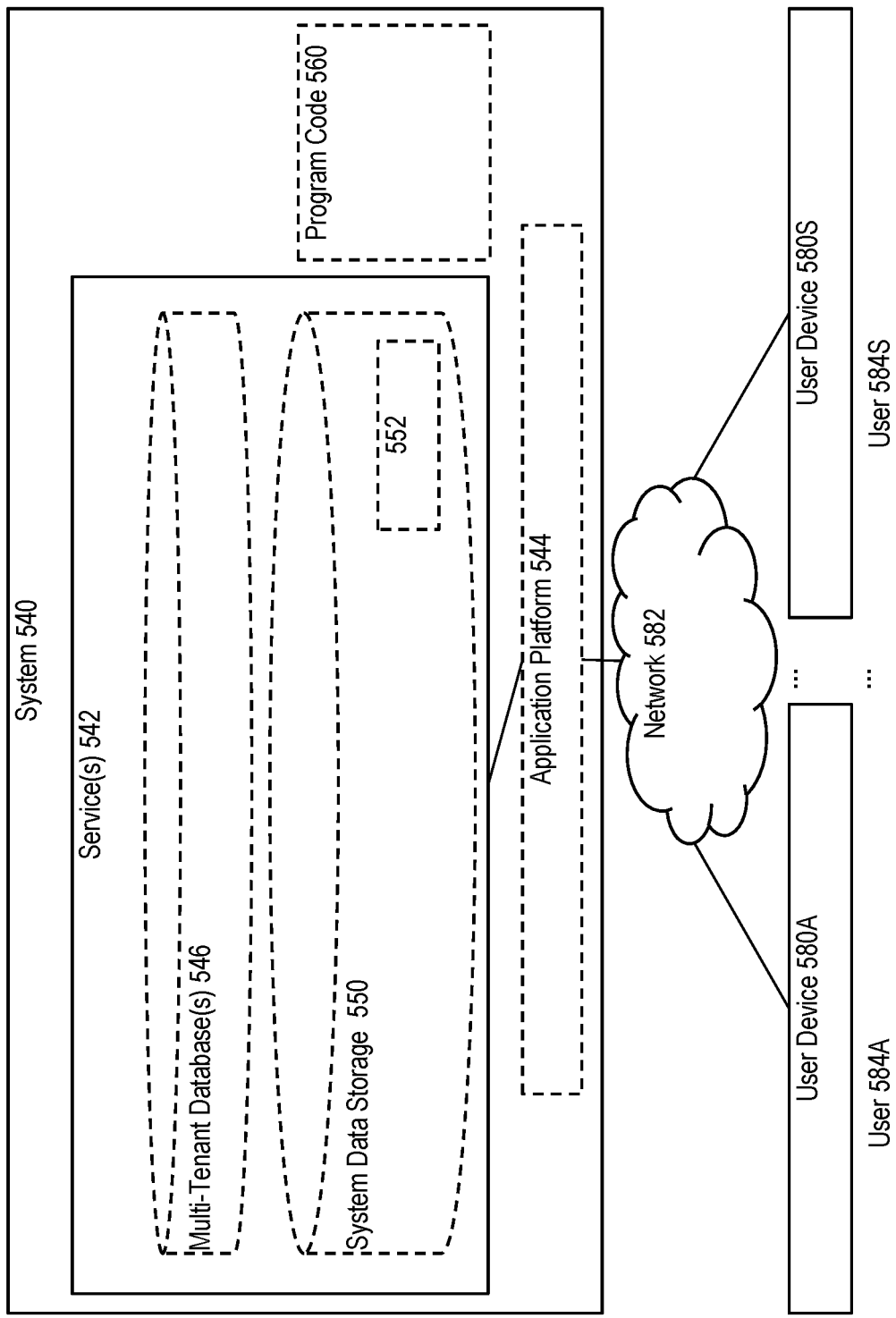
FIG. 5 is a block diagram of a deployment environment according to some example implementations.

FIG. 5 is a block diagram of a deployment environment according to some example implementations. A system 540 includes hardware (e.g., a set of one or more server devices) and software to provide service(s) 542, including the remote resource sharing service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers).

A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc.

A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following types of services: remote resource sharing; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 540 may include an application platform 544 that enables PAAS for creating, managing, and executing one or more applications developed by the provider of the application platform 544, users accessing the system 540 via one or more of user devices 580A-380S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others.

Further, in one implementation, the application platform 544 includes an application setup mechanism that supports application developers' creation and management of applications, which may be saved as metadata by save routines. Invocations to such applications, including the XYZ service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $5^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S.

User devices 580A-480S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A system comprising one or more servers, the one or more servers being configured to:
   determine that a first user has opted in to a trusted group to share a remote secure resource with members of the trusted group, the trusted group including a second user, wherein users can be dynamically added to and removed from the trusted group, any member of which can access the secure resource utilizing the first user's credentials;
   receive, from a platform application server, a request from the first user to access the remote secure resource that is hosted in a computing environment that is distinct from a local computing environment in which the request is made, the platform application server managing meeting and recording metadata;
   validate, with a resource activity application server, credentials for the first user to access the local computing environment, the resource activity application server managing user platform credentials;
   forward the request to a resource activity application server upon successful validation of the credentials for the first user, wherein the forwarded request for access to the secure resource comprises at least a server-to-server token associated with the request;
   utilize credentials of the second user; and
   receive information to allow access to the remote secure resource by the first user providing access to the remote secure resource utilizing the credentials for the second user through a user interface of the local computing environment.

2. The system of claim 1 wherein the first user and the second user are both members of the trusted group, any member of which can access the secure resource utilizing the first user's credentials.

3. The system of claim 1 wherein the platform management agent interface provides the second user access to platform services and to the secure resource.

4. The system of claim 1 wherein the first user, as a member of the trusted group, opts in to share the resource with members of the trusted group.

5. Non-transitory computer-readable medium having stored thereon instructions that, when executed by one or more processors, are configurable to cause the one or more processors to:
   determine that a first user has opted in to a trusted group to share a remote secure resource with members of the trusted group, the trusted group including a second user, wherein users can be dynamically added to and removed from the trusted group, any member of which can access the secure resource utilizing the first user's credentials;
   receive, from a platform application server, a request from the first user to access the remote secure resource that is hosted in a computing environment that is distinct from a local computing environment in which the request is made, the platform application server managing meeting and recording metadata;
   validate, with a resource activity application server, credentials for the first user to access the local computing environment, the resource activity application server managing user platform credentials;
   forward the request to a resource activity application server upon successful validation of the credentials for the first user, wherein the forwarded request for access to the secure resource comprises at least a server-to-server token associated with the request;
   receive information to allow access to the remote secure resource by the first user utilizing credentials of the second user; and
   provide access to the remote secure resource utilizing the credentials for the second user through a user interface of the local computing environment.

6. A method comprising:
   determining that a first user has opted in to a trusted group to share a remote secure resource with members of the sharing group, the trusted group including a second user, wherein users can be dynamically added to and removed from the sharing group, any member of which can access the secure resource utilizing the first user's credentials;
   receiving, from a platform application server, a request from the first user to access the remote secure resource that is hosted in a computing environment that is distinct from a local computing environment in which the request is made, the platform application server managing meeting and recording metadata;
   validating, with a resource activity application server, credentials for the first user to access the local computing environment, the resource activity application server managing user platform credentials;
   forwarding the request to a resource activity application server upon successful validation of the credentials for the first user, wherein the forwarded request for access to the secure resource comprises at least a server-to-server token associated with the request;
   utilizing credentials of the second user; and
   receiving information to allow access to the remote secure resource by the first user;
   providing access to the remote secure resource utilizing the credentials for the second user through a user interface of the local computing environment.

7. A non-transitory computer-readable medium having stored thereon instructions that, when executed by one or more processors, are configurable to cause the one or more processors to:
   determine that a first user has opted in to a trusted group to share a remote secure resource with members of the trusted group, the trusted group including a second user, wherein users can be dynamically added to and removed from the trusted group, any member of which can access the secure resource utilizing the first user's credentials;
   receive, from a platform application server, a request on behalf of the first user to access a remote secure resource that is hosted in a computing environment that is distinct from a local computing environment in which the request is made, wherein the remote secure resource is owned by the second user, wherein the received request for access to the secure resource comprises at least a server-to-server token associated with the request;
   validate, with a resource activity application server, credentials for the first user and consent from a second user for the first user to access the remote secure resource, the resource activity application server managing user platform credentials;
   request access to the remote secure resource utilizing credentials for the second user, if the credentials for the first user and the consent are validated; and send, to the platform application server, information to allow access to the remote secure resource by the first user utilizing credentials of a second user, the platform application server managing meeting and recording metadata.

8. A method comprising:

determining that a first user has opted in to a trusted group to share a remote secure resource with members of the trusted group, the trusted group including a second user, wherein users can be dynamically added to and removed from the sharing group, any member of which can access the secure resource utilizing the first user's credentials;

receiving, from a platform application server, a request on behalf of the first user to access the remote secure resource that is hosted in a computing environment that is distinct from a local computing environment in which the request is made, wherein the remote secure resource is owned by the second user, wherein the received request for access to the secure resource comprises at least a server-to-server token associated with the request;

validating, with a resource activity application server, credentials for the first user and consent from the second user for the first user to access the remote secure resource, the resource activity application server managing user platform credentials;

requesting access to the remote secure resource utilizing credentials for the second user, if the credentials for the first user and the consent are validated; and sending, to the platform application server, information to allow access to the remote secure resource by the first user utilizing credentials of a second user, the platform application server managing meeting and recording metadata.

* * * * *